(12) United States Patent
Cheng

(10) Patent No.: US 10,663,792 B2
(45) Date of Patent: May 26, 2020

(54) DISPLAY SCREEN AND MOBILE TERMINAL

(71) Applicant: GUANGDONG OPPO MOBILE TELECOMMUNICATIONS CORP., LTD., Dongguan, Guangdong (CN)

(72) Inventor: Jiao Cheng, Guangdong (CN)

(73) Assignee: GUANGDONG OPPO MOBILE TELECOMMUNICATIONS CORP., LT, Guangdong (CN)

(*) Notice: Subject to any disclaimer, the term of this patent is extended or adjusted under 35 U.S.C. 154(b) by 0 days.

(21) Appl. No.: 16/223,796

(22) Filed: Dec. 18, 2018

(65) Prior Publication Data

US 2019/0293976 A1 Sep. 26, 2019

(30) Foreign Application Priority Data

Mar. 20, 2018 (CN) .......................... 2018 1 0230173
Mar. 20, 2018 (CN) ..................... 2018 2 0385144 U

(51) Int. Cl.
*G02F 1/13357* (2006.01)
*H04M 1/02* (2006.01)
(Continued)

(52) U.S. Cl.
CPC ...... *G02F 1/1336* (2013.01); *G02F 1/133615* (2013.01); *G02F 1/134336* (2013.01);
(Continued)

(58) Field of Classification Search
CPC .. G02F 1/13338; G02F 1/1336; G02F 1/1333; G02F 1/133345; G02F 1/134336;
(Continued)

(56) References Cited

U.S. PATENT DOCUMENTS

2009/0102763 A1* 4/2009 Border ................ H04N 7/144
345/87
2015/0371612 A1 12/2015 DeLuca
(Continued)

FOREIGN PATENT DOCUMENTS

CN 106506742 A 3/2017
CN 106790836 A 5/2017
(Continued)

OTHER PUBLICATIONS

International Search Report and Written Opinion dated Apr. 1, 2019; PCT/CN2018/124507.
(Continued)

*Primary Examiner* — Richard J Hong
(74) *Attorney, Agent, or Firm* — Ladas and Parry, LLP; Hermine Valizadeh

(57) ABSTRACT

The embodiments of the disclosure provide a display screen and a mobile terminal, and relate to mobile terminals. The display screen may include a display panel and a backlight module. The backlight module may include a backlight panel and a backlight source placed on one side of the backlight panel. The display screen may define an accommodation space at least penetrating the backlight module and used to accommodate functional elements. The display panel may include a non-display area corresponding to the accommodation space in the backlight module, a first display area being set on one side of the non-display area, which is further away from the backlight source than the other side of the non-display area, and a second display area surrounding the non-display area and the first display area. The pixels per inch (PPI) of the first display area are smaller than PPI of the second display area.

15 Claims, 6 Drawing Sheets

(51) Int. Cl.
*G02F 1/1343* (2006.01)
*G06F 1/16* (2006.01)
*G02F 1/1333* (2006.01)

(52) U.S. Cl.
CPC .......... *G06F 1/1626* (2013.01); *G06F 1/1637* (2013.01); *G06F 1/1686* (2013.01); *G06F 1/1694* (2013.01); *H04M 1/026* (2013.01); *H04M 1/0264* (2013.01); *H04M 1/0266* (2013.01); *G02F 1/13338* (2013.01); *G02F 2001/133388* (2013.01); *H04M 2250/12* (2013.01)

(58) Field of Classification Search
CPC .. G02F 1/133615; G02F 2001/133388; H04M 1/0266; H04M 1/0264; H04M 1/026; H04M 2250/12; H04N 5/2251; H04N 7/144; G06F 1/1694; G06F 1/1626; G06F 1/1686; G06F 1/1637
See application file for complete search history.

(56) References Cited

U.S. PATENT DOCUMENTS

| | | | |
|---|---|---|---|
| 2016/0011633 | A1* | 1/2016 | Watanabe ............ G02F 1/1333 345/184 |
| 2017/0293180 | A1* | 10/2017 | Chinen ............. G02F 1/133345 |
| 2017/0301314 | A1 | 10/2017 | Kim et al. |
| 2019/0286193 | A1* | 9/2019 | Feng .................... H04N 5/2251 |

FOREIGN PATENT DOCUMENTS

| | | |
|---|---|---|
| CN | 106850897 A | 6/2017 |
| CN | 106921767 A | 7/2017 |
| CN | 107564470 A | 1/2018 |
| CN | 107656577 A | 2/2018 |
| CN | 107707698 A | 2/2018 |
| CN | 107784989 A | 3/2018 |
| CN | 208079155 U | 11/2018 |

OTHER PUBLICATIONS

European Search Report dated Apr. 15, 2019; Appln. No. 19150212.9.

* cited by examiner

DISPLAY SCREEN AND MOBILE TERMINAL

CROSS REFERENCES

This application claims the benefit of and priority to Chinese application No. 201810230173.0 titled "DISPLAY SCREEN AND MOBILE TERMINAL", filed on Mar. 20, 2018, and Chinese application No. 201820385144.7 titled "DISPLAY SCREEN AND MOBILE TERMINAL," filed on Mar. 20, 2018, which are hereby incorporated by reference herein, in their entireties.

TECHNICAL FIELD

The present disclosure relates generally to mobile terminals, and more specifically to techniques for improving the brightness uniformity of display screens and mobile terminals.

BACKGROUND

With a higher requirements for the display effect of the mobile terminal, the display area of mobile terminal have been extended to achieve a comprehensive screen effect. For example, the display area extends to the area where components (such as a front camera) are set. Although the display area is extended and facilitate the display effect of the full screen, the components such as the front camera provided in the display area may cause uneven brightness of the display screen.

SUMMARY

The present disclosure provides a type of display screen and a type of mobile terminal.

In one aspect, the embodiment of the present disclosure provides a display screen. The display screen may include a display panel and a backlight module. The backlight module may include a backlight panel and a backlight source placed on one side of the backlight panel. The display screen may define an accommodation space at least penetrating the backlight module and used to accommodate functional elements. The display panel may include a non-display area corresponding to the accommodation space in the backlight module, a first display area being set on one side of the non-display area, which is further away from the backlight source than the other side of the non-display area, and a second display area surrounding the non-display area and the first display area. The pixels per inch (PPI) of the first display area are smaller than PPI of the second display area.

In another aspect, the embodiments of the disclosure further provide a mobile terminal. The mobile terminal may include a display screen and a non-display assembly. The display screen may include a display panel and a backlight module. The backlight module may be used to provide a backlight by a backlight source. The display screen may define an accommodation space at least penetrating the backlight module and used to accommodate functional elements. The display panel may include a non-display area corresponding to the accommodation space in the backlight module, a first display area being set on one side of the non-display area, which is further away from the backlight source than the other side of the non-display area, and a second display area surrounding the non-display area and the first display area. The pixels per inch (PPI) of the first display area are smaller than PPI of the second display area. The non-display assembly may be mounted in the accommodation space and used to accommodate functional elements In further another aspect, the embodiment of the present disclosure provides a mobile terminal. The mobile terminal may include a display screen and functional elements. The display screen may include a backlight module and define an accommodation space. The accommodation space may at least penetrate the backlight module and be used to accommodate the functional elements. The pixels per inch (PPI) of a first display area of the backlight module is smaller than PPI of a second display area of the backlight module, the first display area is around the accommodation space and on one side of the accommodation space away from the backlight source. The functional elements may be electrically mounted in the accommodation space.

BRIEF DESCRIPTION OF THE DRAWINGS

In order to more clearly illustrate the technical solution of the present disclosure, a brief description of the drawings used in the embodiments will be briefly described below. Obviously, the drawings in the following description are only some of the embodiments of the present disclosure, and those skilled in the art can obtain other drawings according to the drawings without any creative work.

FIG. 1I is a structural block view of the mobile terminal according to the third embodiment of the disclosure.

DETAILED DESCRIPTION

Figure 1:
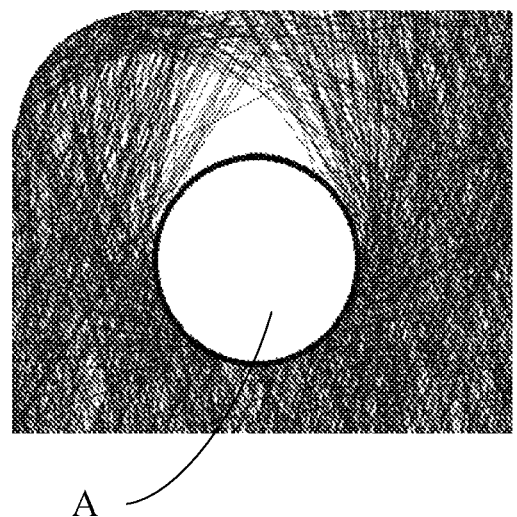
FIG. 1 is a schematic view of ray simulation in a related art due to the blocking of components in the hole, resulting in uneven brightness of the display screen.

Hereinafter, embodiments of the disclosure will be described in detail. Examples of the embodiments are illustrated in the accompanying drawings. Throughout, the same or similar reference numerals indicate the same or similar elements or elements having the same or similar functions. The embodiments described below with reference to the drawings are exemplary, are used for explaining the disclosure only, and should not be construed as limiting the present disclosure.

In the description of the present disclosure, it is to be understood that the terms "center", "longitudinal", "transverse", "length", "width", "thickness", "upper", "lower". "front", "back", "left", "right", "vertical", "horizontal", "top", "bottom", "inner", "outside", "clockwise" and "counterclockwise" indicates an orientation or positional relationship based on the orientation or positional relationship shown in the drawings. It is merely for convenience of description of the disclosure and simplification of the description, and does not indicate or imply that the indicated device or element must have a particular orientation, be constructed and operated in a particular orientation, and therefore should not be construed to limit the present disclosure.

Furthermore, terms "first" and "second" are used for descriptive purposes only, and are not to be construed as indicating or implying relative importance or implicitly indicating the number of indicated technical features. Thus, features that are defined as "first", "second" may explicitly or implicitly include one or more of the described features. In the description of the disclosure, the term of "plurality" means two or more than two, unless specifically defined otherwise.

In the description of the disclosure, it is to be understood that the terms "install", "connect", "couple" should be broadly understood, unless otherwise specified and defined. For example, a connection may be a fixed connection or a removable connection, or an integrally connection. A connection can be a mechanical connection or an electrical connection or can communicate with each other. A connection also can be a directly connection or an indirectly connection by intermediate medium. A connection can be the internal communication of two elements or the interaction of two elements. The specific meaning of the above-mentioned terms in the disclosure may be understood by those skilled in the art considering specific circumstances.

In the present disclosure, the "up" or "down" of the first feature in the second feature may include direct contact between the first and second features, or not direct contact but contact by further features between them. Moreover, the first feature "above", "up" and "upside" the second feature includes the first feature directly above and diagonally above the second feature, or simply indicating that the first feature is higher in height than the second feature. The first feature "below", "down" and "under" the second feature includes the first feature directly below and diagonally below the second feature, or merely indicating that the first feature is less horizontal than the second feature.

The display screen usually is set on mobile phones, tablets, and other mobile terminals, and configured to display text, pictures, icons, or videos. As more clarity and accuracy are demanded, more mobile terminals provide a larger touch display screen to achieve a full screen display effect. However, for a larger display screen, functional elements such as a front camera, a proximity light sensor, or an earpiece provided at the front of the mobile terminal may interfere the touch display screen.

Generally, the mobile terminal may include a front panel, a rear cover and a frame. The front panel may include an upper area, a middle screen area, and a lower area. Wherein, the upper area may be at the top of the display panel, the middle screen area may be at the middle of the front panel, and the lower area may be at the lower end of the display panel. Generally, the upper area is provided with functional elements such as a sound outlet of the earpiece and a front camera. The middle screen area is provided with a touch display screen, and one to three physical buttons are arranged in the lower area. With the development of technology, the lower area is gradually canceled, and the physical button is replaced by a virtual button in the touch display screen.

The functional elements such as the sound outlet of the earpiece and the front camera provided in the upper area are important for the mobile phone, and are not suitable to cancel. Therefore, it is difficult to extend the display area of the touch display screen to cover the upper area. After a series of studies, the inventors found that a hole can be defined in the display area of the touch display screen, and the functional elements set in the upper area may be collectively set in the hole, so that the upper area can be extend into a partial of the display screen to increase the display area to achieve a full-screen effect. The touch display screen may include a cover panel, a touch sensor, a display screen, and a rear panel. Wherein, the cover panel, the touch sensor, the display screen, and the rear panel are stacked. The hole defined in the display area of the touch display screen extends from the rear panel toward the cover panel.

However, the inventors have found that since the backlight source of the mobile terminal is usually side-lit, components such as the front camera disposed in the hole may cause partial light emitted by the backlight source of backlight module to be blocked. As a result, the display brightness of a side area of the display screen is darker than other area, causing the brightness of the display screen uniformity (refer to FIG. 1, a letter "A" in FIG. 1 indicates the position corresponding to the hole). Wherein, the side area is around a non-display area, and away from the backlight source, the non-display area corresponds to the hole. Therefore, in the present disclosure, the inventors have proposed a display screen and a mobile terminal capable of improving the brightness uniformity of the display screen.

In some embodiments of the present disclosure, the functional elements may be at least one of a projector, a camera, a proximity light sensor, an earpiece, a distance sensor, an ambient light level sensor, a temperature sensor, and a pressure sensor.

The hole of the display area (hereinafter also referred to as accommodation space) may be defined at one or more edges or corners of the display screen, and the shape of the hole may be a circle, a semicircle, a rectangular rectangle, a rounded rectangle, a regular polygon or an irregular polygon, etc. The hole can accommodate at least one functional element of the projection assembly, the camera, the proximity light sensor, the earpiece, the distance sensor, the ambient light level sensor, the temperature sensor, and the pressure sensor.

Embodiments of the present disclosure will be specifically described below with reference to the accompanying drawings.

Figure 2:
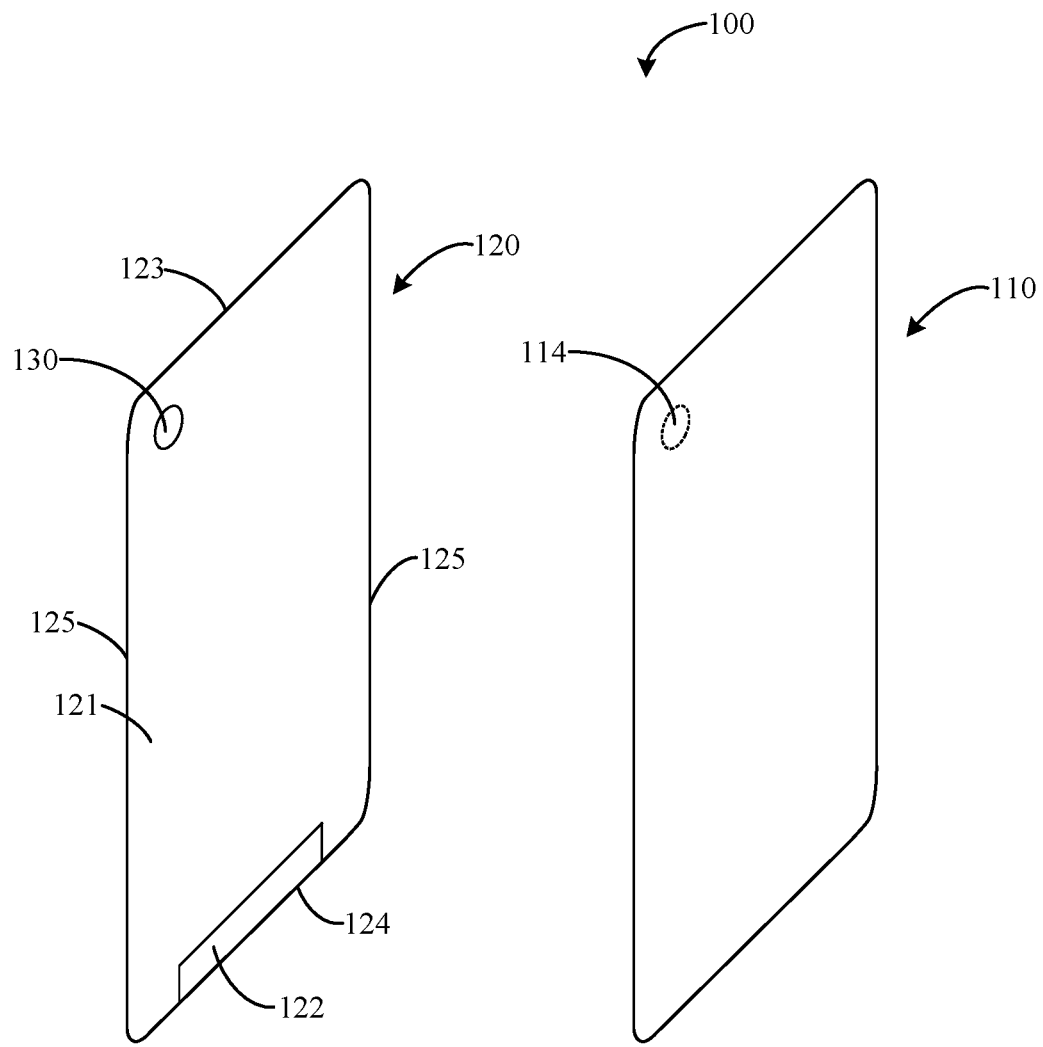
FIG. 2 is an exploded view showing a display screen according to the first embodiment of the present disclosure.

As illustrated in FIG. 2, FIG. 2 is an exploded view of the display screen 100 according to the first embodiment in the disclosure. In the embodiment, the display screen 100 may be a liquid crystal display (LCD). In some embodiments, the display screen 100 may be a touch liquid crystal display, and the display screen 100 may include a touch film. The display screen 100 may include a display panel 110 and a backlight module 120.

In the embodiment of the disclosure, the shape of the backlight module 120 may correspond to the shape of the display panel 110, and may be a flat plate. The backlight module 120 includes a top 123, a bottom 124, and two sides 125.

The backlight module 120 may include a backlight panel 121 and a backlight source 122. The backlight source 122 may be disposed at a top, a bottom, or at least one side of the backlight panel 121, that is, the backlight source 122 may be positioned at the top 123, the bottom 124, or at least one side 125 of the backlight module 120. The backlight source 122 can be set at one position, or multiple backlight sources 122 can be set at different positions. In the embodiment, the backlight source 122 is positioned at the bottom 124 of the backlight module 120 for exemplary illustration.

In the embodiments, the backlight source 122 may be a point source or a line source. In some embodiments, the backlight source 122 can be one or more light emitting diode (LED) point sources. In other embodiments, the backlight source 122 can also be a line source formed by LEDs packaging.

The display screen 100 defines an accommodation space 130, and the accommodation space 130 at least penetrates the backlight module 120. The accommodation space 130 is used to accommodate the functional element.

In the embodiments, the accommodation space 130 can be defined anywhere on the display screen 100. In some embodiments, in order to reduce interference with the screen display, the accommodation space 130 may be defined near a corner of the display screen 100. That is, the corner of the display screen defines the accommodation space. Wherein, according to the size of the functional element, the accommodation space 130 may only penetrate the backlight module 120, or may further partially or completely penetrate the display panel 110.

In the embodiment of the disclosure shown in FIG. 2, the accommodation space 130 is defined in the upper-left corner of the display screen 100, which means, the accommodation space 130 is defined on the left side of the top 123 of the backlight module 120. In some embodiments, the accommodation space 130 may also be defined on the right or middle of the top 123 of the backlight module 120, or on the left, middle or right side of the bottom 124, or other positions. In this embodiment, the upper-left corner of the display screen 100 defines the accommodation space 130 for exemplary description.

The accommodation space 130 may be of any shape. In some embodiments of the present disclosure, the accommodation space 130 may be a circular aperture. In some other embodiments, the accommodation space 130 may also be a semicircle, a rectangular rectangle, a rounded rectangle, a triangle, an ellipse, a regular polygon, an irregular polygon, or other shapes.

Figure 3:
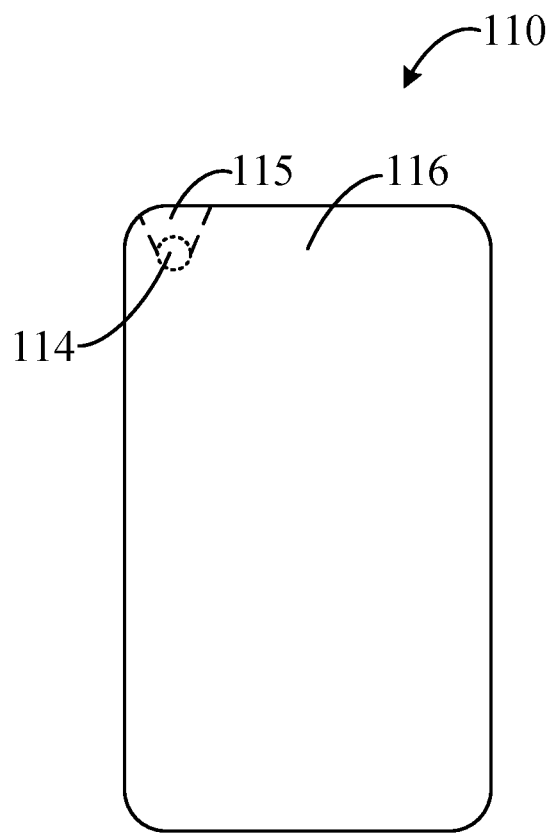
FIG. 3 is a plan view showing the display panel according to the first embodiment of the disclosure.
Figure 4:
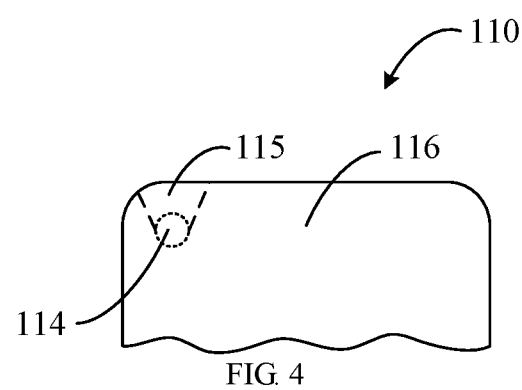
FIG. 4 shows a partial view of the top of the display panel illustrated in FIG. 3.

Referring to FIG. 3 and FIG. 4, FIG. 3 is a plan view of the display panel 110 according to the first embodiment of the disclosure, and FIG. 4 is a partial view of the top of the display panel 110 of FIG. 3.

In some embodiments, the display panel 110 may be a rectangular or rounded rectangle, and may include a top 111, a bottom 112 opposite the top 111, and two sides 113 opposite each other.

In the embodiment of the disclosure, the display panel 110 may include a non-display area 114, a first display area 115, and a second display area 116 surrounding the non-display area 114 and the first display area 115. The position of the non-display area 114 in the display panel 110 corresponds to the position of the accommodation space 130 in the backlight module 120, that is, the non-display area 114 corresponds to the accommodation space 130. For example, the non-display area 114 in the display panel 110 may face the accommodation space 130. It can be understood that in different embodiments, the non-display area may be a hole or a light-transmitting plate.

When the functional elements are disposed in the accommodation space, the functional elements cuts off the light emitted from the backlight source. As a result, in an area around the accommodation space, set on one side of the non-display area and away from the backlight source 122 than the other side of the non-display area, that is, above the accommodation space 130 shown in FIG. 3 and FIG. 4, the light is sparse, that is, the display brightness is lowered. In the embodiment of the disclosure, the first display area 115 may be considered as an area with sparse light. The second display area 116 in the embodiment of the disclosure may be other display areas in the display panel 110 except the non-display area 114 and the first display area 115.

PPI can indicate the number of pixels per inch. The smaller the PPI value, the higher the light transmittance of the display panel 110. In the embodiment of the disclosure, the light transmittance of the first display area 115 can be increased by lowering the PPI, thereby improving the display brightness in the first display area 115. That is, in the embodiment of the disclosure, the pixels per inch (PPI) of the first display area 115 may be set to be less than the PPI of the second display area 116.

In the embodiment of the disclosure, the PPI of the first display area 115 can be adjusted to adjust the brightness of the first display area 115, and make the brightness difference between the first display area 115 and the second display area 116 within the acceptable range of the human eye when the functional elements are disposed in the accommodation space, thereby improving the brightness uniformity of the entire display panel 110.

In other embodiments, the PPI of the second display area 116 may be increased to reduce the light transmittance of the second display area 116, therefore brightness of the first display area 115 and the second display area 116 can be uniform.

In the embodiment of the disclosure, the PPIs of different areas of the first display area 115 may be the same or different.

Figure 5:
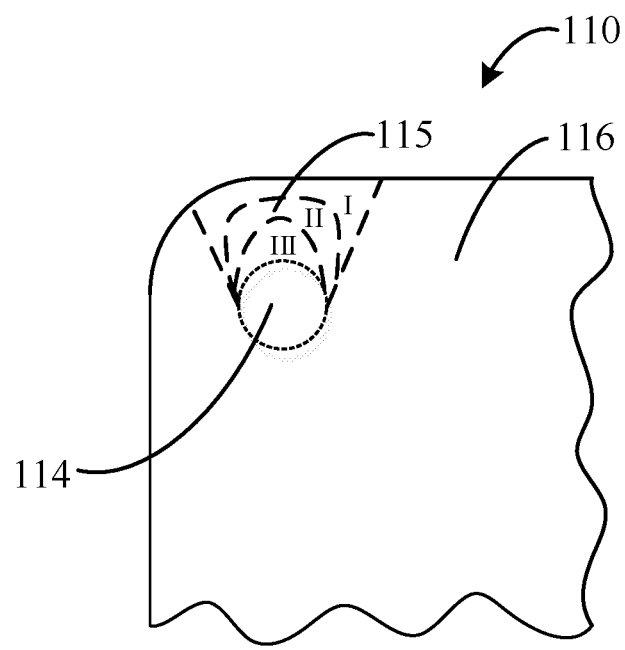
FIG. 5 is a schematic view showing the light distribution of the first display area on the display panel according to the first embodiment of the disclosure.

Referring to FIG. 5, the degree of light density of the first display area 115 at the display panel 110 is divided. As a possible case, when the functional elements are disposed in the accommodation space, as shown in FIG. 5, the degree of light density at different areas of the first display area 115 may be not exactly the same. Illustrated in FIG. 5, the PPIs in different areas may be separately adjusted, wherein, the different areas correspond to different light densities in the first display area 115. That is, the PPIs of different areas of the first display area 115 may be not exactly the same.

In the embodiment shown in FIG. 5, from a side of the first display area 115 away from the accommodation space 130, toward a side close to the non-display area 114, the degree of light density in the first display area 115 gradually become sparse. In this case, from one side of the first display area 115 which is away from the non-display area 114 to one side of the first display area which is close to the non-display area 114, the PPI of the first display area 115 may be set to gradually decrease. It can be understood that, after the above adjustment, from the side of the first display area 115 away from the non-display area 114 to the side close to the non-display area 114, the light transmittance of the first display area 115 is gradually increase.

In the embodiment shown in FIG. 5, the degree of light density in the first display area 115 gradually be sparse from the boundary between the first display area 115 and the second display area 116 to the center of the first display area 115. In this case, the PPI of the first display area 115 may be set to gradually decrease from the boundary between the first display area 115 and the second display area 116 to the center of the first display area 115. In the embodiment, after the above adjustment, from the boundary between the first display area 115 and the second display area 116 to the center of the first display area 115, the light transmittance of the first display area 115 is gradually increase.

In the embodiment of the disclosure, the center of the first display area 115 may not be the geometric center or center of gravity. It may indicate a position in the first display area 115 that is farthest from the boundary between the first display area 115 and the second display area 116. For example, as shown in FIG. 5, an area near the non-display area 114 and in the middle of the first display area 115 is farthest from the boundary between the first display area 115 and the second display area 116, and the light is the sparser. Therefore, the area can be considered to the center of the first display area 115, and its PPI may be adjusted to be the smallest relative to other areas.

In the embodiment shown in FIG. 5, the PPI of the first display area 115 can also be adjusted according to the above two case. That is, from a side of the first display area 115 away from the non-display area 114 toward a side close to the non-display area 114, and from the boundary between the first display area 115 and the second display area 116 to the center of the first display area 115, the PPI of the first display area 115 may be set to be gradually decreased.

The above embodiments of adjusting the gradual change of the PPI may not be limited to the case shown in FIG. 5. It can be understood that, in other different embodiments, the light density of different areas of the display screen 100 may change due to the different structure of the different display screens and different position of the backlight source 122. The position and area of the first display area 115, and the position and area of the second display area 116 on the display panel 110 may also change. The adjustment of the PPI in the first display area 115 may be different. In some embodiments, the adjustment of the PPI in the first display area 115 may be not gradual, but may be jump or no obvious irregular. Regardless of the change of the degree of light density at different areas of the display screen 100, the position and area of the first display area 115, and the position and area of the second display area 116 on the display panel 110, the PPI of the area with sparse light may be adjust to a relatively low level. The sparser the light, the smaller the PPI should be adjusted. In the embodiment of the disclosure, different display screen 100 with different structure increase the light transmittance of the non-display area 114 peripheral by adjusting the PPI around the non-display area 114 of the display panel 110, are all within the protection scope of the disclosure.

In the embodiment, the display screen 100 can improve the transmittance of the first display area 115 by lowering the PPI of the first display area 115 in the display panel 110, thereby improving the brightness of the first display area 115. According to the actual situation, when the functional elements are disposed in the accommodation space, the brightness of the first display area 115 and the second display area 116 can be the same by adjusting the PPI of the first display area 115, and the brightness uniformity of the display screen 100 can effectively be improved.

Figure 6:
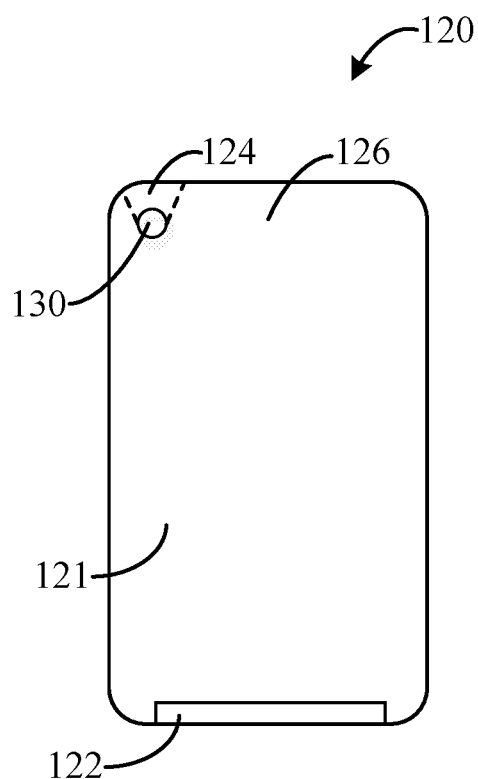
FIG. 6 is a plan view showing a backlight module according to the second embodiment of the disclosure.
Figure 7:
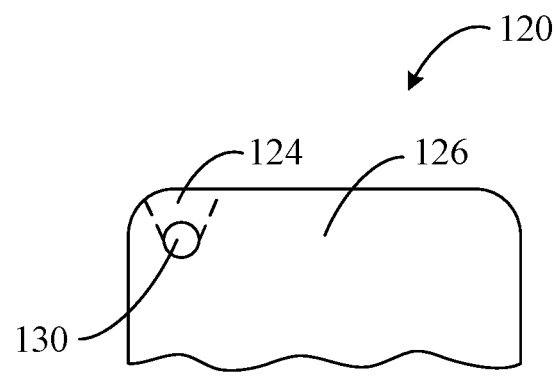
FIG. 7 shows a partial view of the top of the backlight module according to FIG. 6.

FIG. 6 is a plane view showing the backlight module 120 according to a second embodiments. FIG. 7 is a partial view of the top of the backlight module 120 according to FIG. 6.

Different from the first embodiment of the disclosure, in the second embodiment of the disclosure, the brightness uniformity of the display screen 100 is further improved by adjusting different backlight area of the backlight module 120.

The backlight module 120 of the display screen 100 in this embodiment may include a first backlight area 124 and a second backlight area 126. Wherein, the first backlight area corresponds to the first display area 115 of the display panel 110, and the second backlight area 126 corresponds to the second display area 116 of the display panel 110.

In the embodiment of the disclosure, the brightness of the first backlight area 124 is related to the degree of light density in the space corresponding to the first backlight area 124. Similarly, the brightness of the second backlight area 126 is related to the degree of the light density in the space corresponding to the second backlight area 126.

It can be understood that the denser the light in the space corresponding to the first backlight area 124, the higher the brightness of the first backlight area 124, and the higher the brightness of the first display area 115. The sparser the light in the space corresponding to the first backlight area 124, the lower the brightness of the first backlight area 124, and the lower the display brightness of the first display area 115. Similarly, the denser the light in the space corresponding to the second backlight area 126, the higher the brightness of the second backlight area 126, and the higher the display brightness of the second display area 116. The sparser the light in the space corresponding to the second backlight area 126, the lower the brightness of the second backlight area 126, and the lower the brightness of the second display area 116.

When the functional elements are set in the accommodation space 130, the space corresponding to the first backlight area 124 has sparser light than the space corresponding to the second backlight area 126. That is, the original brightness of the first backlight area 124 is lower than the second backlight area 126. Wherein, the original brightness is a brightness before adjusting the light density. Therefore, in order to make the brightness of the first backlight area 124 and the second backlight area 126 equal, the brightness of the first backlight area 124 may need to be increased. So that, in the embodiment, in the display screen without the functional elements, the brightness of the first backlight area 124 is greater than the brightness of the second backlight area 126.

In the embodiment of the disclosure, adjusting the brightness of the first backlight area 124 to be greater than the brightness of the second backlight area 126 can be implemented by various means. The adjustment of the brightness or the light guiding ability of the backlight area can be realized by changing the reflection structure of the backlight board of the backlight module 120 or the structure of the optical film, and details are not described herein. When the functional elements are disposed in the accommodation space, the brightness of the first backlight area 124 is adjusted to tend to be equal to the second backlight, and correspondingly, the brightness of the first display area 115 and the second display area 116 in the display panel 110 tend to be equal, that is, the brightness uniformity of the display screen 100 is improved.

In the embodiment of the disclosure, the density of the backlight light in different positions of the space corresponding to (including the first backlight area 124 and the second backlight area 126) the backlight module 120 is further adjusted, to make the density of the backlight light differentiated distributions in different positions, and when the functional elements are disposed in the accommodation space, the display brightness distribution of different display areas (including first display area 115 and second display area 116) of the display panel 110 can be more uniform.

Figure 8:
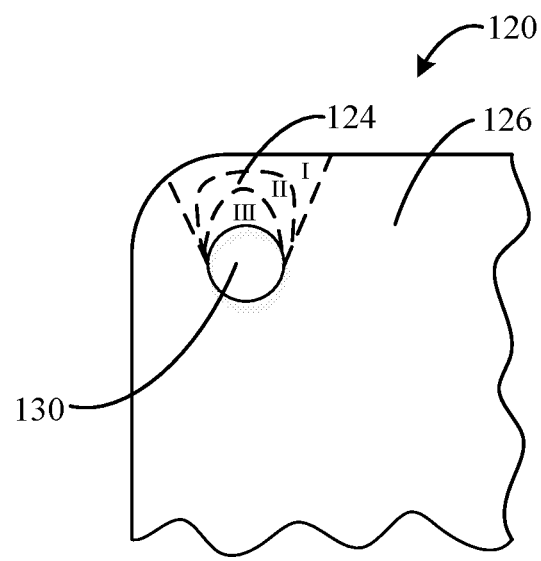
FIG. 8 is a schematic view showing light distribution of the first backlight area on the backlight module according to the second embodiment of the disclosure.

To facilitate the description of the situation similar to FIG. 5 provided by the first embodiment of the present disclosure, the second embodiment of the disclosure provides FIG. 8. In FIG. 8, the degree of light density in the space corresponding to the first backlight area 124 of the backlight module 120 is divided. As a possible case, when the functional elements are disposed in the accommodation space, as shown in FIG. 8, the original light density of different areas in the first backlight area 124 may be not exactly the same. In the case of the case shown in FIG. 8, the brightness of different areas corresponding to different degrees of light density in the first backlight area 124 may be adjusted separately.

In the embodiment shown in FIG. 8, from a side of the first backlight area 124 away from the accommodation space 130, toward a side close to the non-display area 114, the degree of original light density in the space corresponding to the first backlight area 124 gradually become sparse from the region I to region III in FIG. 5. In this case, from the side of the first backlight area 124 away from the accommodation space 130 to the side close to the non-display area 114, the brightness of the first backlight area 124 may be set to gradually increase. It can be understood that, after the above adjustment, when the functional elements are disposed in the accommodation space, the light density in the space corresponding to the first backlight area 124 and the light density in the space corresponding to the second backlight area 126 are approximately equal.

In the embodiment shown in FIG. 8, the degree of original light density in the first backlight area 124 gradually be sparse from the boundary between the first backlight area 124 and the second backlight area 126 to the center of the first backlight area 124. In this case, the brightness of the first backlight area 124 may be set to gradually increase from the boundary between the first backlight area 124 and the second backlight area 126 to the center of the first backlight area 124. In the embodiment, after the above adjustment, the light density in the space corresponding to the first backlight area 124 is greater than the space corresponding to the second backlight area 126, and when the functional elements are disposed in the accommodation space, the light densities in the spaces corresponding to the first backlight area 124 and the second backlight area 126 are approximately equal.

In the embodiment of the disclosure, the center of the first backlight area 124 may not be the geometric center or center of gravity. It may indicate a position in the first backlight area 124 that is farthest from the boundary between the first backlight area 124 and the second backlight area 126. For example, as shown in FIG. 8, an area near the accommodation space 130 and in the middle of the first backlight area 124 is farthest from the boundary between the first backlight area 124 and the second backlight area 126, and the light is the sparser. Therefore, the area can be considered to the center of the first backlight area 124, and its brightness may be adjusted to be the highest relative to other areas.

In the embodiment shown in FIG. 8, the brightness of the first backlight area 124 can also be adjusted according to the above two case. That is, from a side of the first backlight area 124 away from the accommodation space 130 toward a side close to the accommodation space 130, and from the boundary between the first backlight area 124 and the second backlight area 126 to the center of the first backlight area 124, the brightness of the first display area 115 may be set to be gradually increased.

The above embodiments of adjusting the gradual change of the brightness may not be limited to the case shown in FIG. 8. It can be understood that, in other different embodiments, the light density of different areas of the display screen 100 may change due to the different structure of the different display screens and different position of the backlight source 122. The position and area of the first backlight area 124, and the position and area of the second backlight area 126 of the backlight module 120 may also change. The adjustment of the brightness in the first backlight area 124 may be different. In some embodiments, the adjustment of the brightness in the first backlight area 124 may be not gradual, but may be jump or no obvious irregular. Regardless of the change of the degree of light density at different areas of the display screen 100, the position and area of the first backlight area 124 and the second backlight area 126 of the backlight module 120, the brightness of the area with sparse original light may be adjust to a relatively high level. The sparser the light, the higher the brightness should be adjusted. In the embodiment of the disclosure, for different display screen 100 with different structure, the display brightness of each area on the display panel 110 may be uniform by adjusting the brightness of the backlight module 120, are all within the protection scope of the disclosure.

Compared with the first embodiment of the disclosure, in the second embodiment of the disclosure, the display screen 100 adjusts the brightness of different areas of the backlight module 120 to adjust the light density in different spaces corresponding to different positions in the display screen 100, thereby further improving the display brightness of the first display area 115 in the display panel 110. And according to the actual situation, in the display screen without the functional elements, the brightness of the first backlight area 124 is greater than the brightness of the second backlight area 126 by adjusting the brightness of different areas of the backlight module 120, and when the functional elements are disposed in the accommodation space, the brightness of the first display area 115 and the second display area 116 can be the same. So that, the brightness uniformity of the display screen 100 can effectively be improved.

Figure 9:
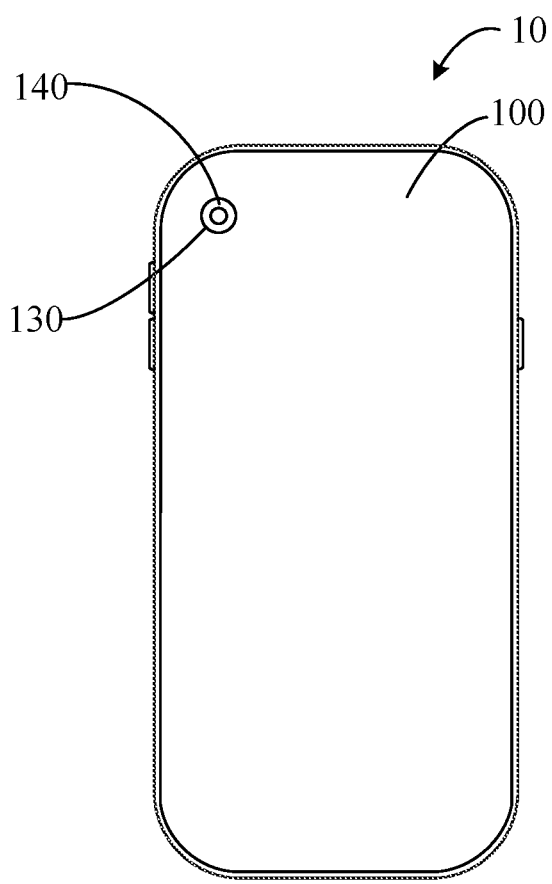
FIG. 9 is a schematic view of the mobile terminal according to a third embodiment of the present disclosure.

Referring to FIG. 9, FIG. 9 is a schematic view of the mobile terminal 10 according to a third embodiment of the disclosure. In the third embodiment of the present disclosure, the mobile terminal 10 may include the display screen 100 provided by the first embodiment or the second embodiment of the disclosure, and a non-display assembly 140. The non-display assembly 140 is mounted in the accommodation space 130 of the display screen 100.

In the embodiment of the disclosure, the non-display assembly 140 can be configured to mount functional elements, such as a front camera.

Figure 10:
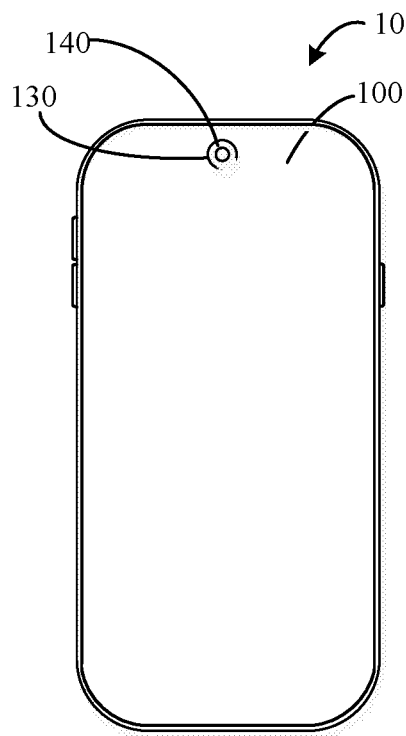
FIG. 10 is a schematic view of the mobile terminal according to a third embodiment of the present disclosure, wherein the accommodation space has different position relative to FIG. 9.

Referring to FIG. 10, it can be understood, in the embodiments of the disclosure, the accommodation space 130 can be defined in a middle of two sides of the display screen 100.

Figure 11:
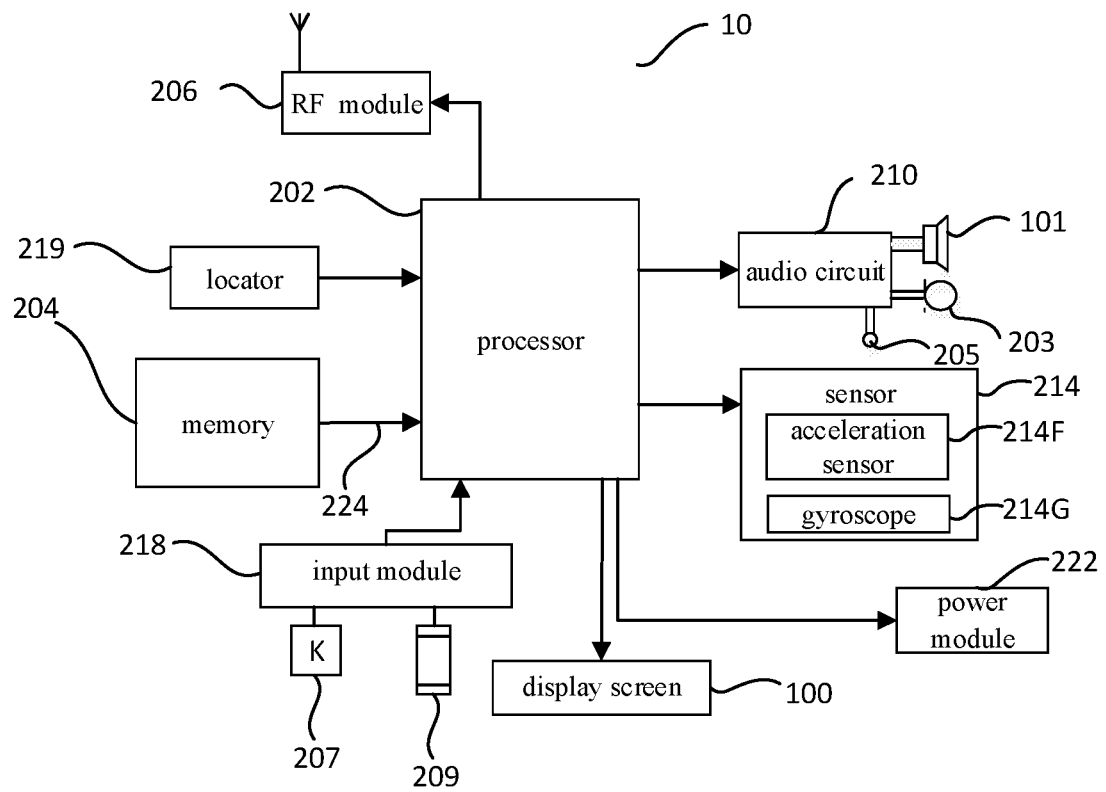

Referring to FIG. 11, the mobile terminal 10 of the above embodiment may include one or more (only one shown in the figure) processor 202, memory 204, RF (radio frequency) module 206, audio circuit 210, sensor 214, input module 218, and power module 222. It will be understood by those of ordinary skill in the art that the structure shown in FIG. 11 is merely illustrative and does not limit the structure of the mobile terminal 10. For example, the mobile terminal 10 may also include more or less components than those illustrated in FIG. 11, or have a different correspondence than that illustrated in FIG. 11.

One of ordinary skill in the art will appreciate that all other components are peripherals relative to processor 202, and processor 202 is coupled to the peripherals via a plurality of peripheral interfaces 224. The peripheral interface 224 can be implemented based on the following standards: universal asynchronous receiver/transmitter 224

(UART), general purpose input output (GPIO), serial peripheral interface (SPI), inter-integrated Circuit (I2C), but not limited to the above standards. In some examples, peripheral interface 224 may only include a bus, and in other examples, peripheral interface 224 may also include other components, such as one or more controllers, such as a display controller for connecting the display screen 100 or a memory controller for connecting to the memory. In addition, these controllers can also be detached from the peripheral interface 224 and integrated into the processor 202 or within a corresponding peripheral.

The memory 204 can be configured to store software programs and modules, and the processor 202 executes various functional applications and data processing by running software programs and modules stored in the memory 204. Memory 204 may include a high speed random access memory and may also include a non-volatile memory such as one or more magnetic storage devices, flash memory, or other non-volatile solid state memory. In some embodiments, memory 204 may further include a memory remotely configured relative to processor 202, which may be connected to mobile terminal 10 or display screen 100 via a network. Embodiments of such networks include, but are not limited to, the Internet, intranets, local area networks, mobile communication networks, and combinations thereof.

The RF module 206 is configured to receive and transmit electromagnetic waves, and convert electromagnetic waves and electrical signals to communicate with a communication network or other device. The RF module 206 can include various existing circuit components for performing these functions, such as an antenna, a radio frequency transceiver, a digital signal processor, an encryption/decryption chip, a subscriber identity module (SIM) card, a memory, and the like. The RF module 206 can communicate with various networks such as the Internet, an intranet, a wireless network, or communicate with other devices over a wireless network. The wireless network described above may include a cellular telephone network, a wireless local area network, or a metropolitan area network. The above wireless network can use various communication standards, protocols and technologies, including but not limited to global system for mobile communication (GSM), enhanced data GSM environment (EDGE), wideband code division multiple access (W-CDMA), code division access (CDMA), time division multiple access (TDMA), wireless fidelity (Wi-Fi) (such as the institute of electrical and electronics engineers standards IEEE 802.10A, IEEE 802.11b, IEEE 802.11g and/or IEEE 802.11n), voice over internet protocol (VoIP), worldwide interoperability for microwave access, (Wi-Max), other protocols for mail, instant messaging and short messages, and any other suitable communication protocols, even those that are not currently being developed.

The audio circuit 210, a telephone receiver 201, a sound jack 203, and a microphone 205 together provide an audio interface between the user and the mobile terminal 10. Specifically, the audio circuit 210 receives sound data from the processor 202, converts the sound data into an electrical signal, and transmits the electrical signal to the telephone receiver 201. The telephone receiver 201 converts the electrical signal into a sound wave that can be heard by the human ear. The audio circuit 210 also receives electrical signals from the microphone 205, converts the electrical signals into sound data, and transmits the sound data to the processor 202 for further processing. Audio data may be obtained from memory 204 or through RF module 206. Additionally, audio data may also be stored in memory 204 or transmitted by RF module 206.

The sensors 214 are disposed within the mobile terminal 10 or within the display screen 100, examples of which include, but are not limited to, an acceleration sensor 214F, a gyroscope 214G, a magnetometer, and other sensors.

Specifically, the gyroscope 214G can detect the attitude of the mobile terminal 10, thereby determining the orientation of each component, determining the orientation of the display screen 100, determining the orientation of the screen, and the like. The acceleration sensor 214F can detect the magnitude of acceleration in each direction (typically three axes), the magnitude and direction of gravity can be detected at rest, and can be configured to identify the application of the mobile terminal 10 (such as horizontal and vertical screen switching, related games, magnetometer attitude calibration), vibration recognition related functions (such as pedometer, tapping) and the like. In addition, the mobile terminal 10 can also be equipped with other sensors such as the gyroscopes, the magnetometer, a barometer, a hygrometer, a thermometer, etc., and will not repeat them here.

In this embodiment, the input module 218 may include a touch display screen 209 disposed on the display screen 14, and the touch display screen 209 may collect the user's touch operation thereon or near (for example, the user operates on the touch display screen 209 or near the touch display screen 209 using any suitable object or accessory such as a finger or a stylus.), obtain the user's touch gesture, and drive the corresponding connecting device according to a preset program. Alternatively, the touch display screen 209 may include a touch detection device and a touch controller. Wherein, the touch detection device detects the touch orientation of the user, detects a signal brought by the touch operation, and transmits the signal to the touch controller; the touch controller receives touch information from the touch detection device, converts the touch information into contact coordinates, sends it to the processor 202, and can receive and execute commands from the processor 202. In addition, the touch detection function of the touch display screen 209 can be realized by various types such as resistive, capacitive, infrared, and surface acoustic waves. In addition to touch display screen 209, in other variant embodiments, input module 218 may also include other input devices, such as button 207. The button 207 may include, for example, a character button for inputting a character, and a control button for triggering a control function. Examples of control buttons include a "return to home screen" button, a power on/off button, and the like.

The display screen 100 is used to display information input by the user, information provided to the user, and various graphical user interfaces of the mobile terminal 10, and these graphical user interfaces may be composed of graphics, text, icons, numbers, videos, and any combination thereof. In one example, the touch display screen 209 can be disposed on the display screen 100 to form an integral with the display screen 100. Wherein, a touch screen can be provided in each display area of the display screen 100.

The power module 222 is used to provide power to the processor 202 and other components. Specifically, the power module 222 may include a power management system, one or more power sources (such as a battery or an alternating current), a charging circuit, a power failure detecting circuit, an inverter, a power status indicator, and any other components related to the generation, management, and distribution of power within the mobile terminal 10 or the display module.

The mobile terminal 10 also includes a locator 219 for determining the actual location of the mobile terminal. In this embodiment, the locator 219 uses a positioning service to implement positioning of the mobile terminal 10, and the location service should be understood as a technique or service for obtaining the location information of the mobile terminal 10 through a specific positioning technology and marking the location of the located object on the electronic map.

In summary, the display screen and the mobile terminal provided by the embodiment of the present disclosure include a display panel, the display panel include the first display area with a lower display brightness away from the backlight source, and a second display area with normal brightness surrounding the first display area. The display screen and the mobile terminal provided by the embodiment of the present disclosure can improve the transmittance of the first display area by decreasing the PPI of the first display area in the display panel, thereby improving the display brightness of the first display area. The brightness of the first display area and the second display area can be kept consistent to effectively improve the brightness uniformity of the display screen.

In the description of the present specification, the description with reference to the terms "one embodiment", "some embodiments", "example", "specific example", or "some examples" and the like means that the specific features, structures, materials or characteristics described in connection with the embodiments or examples are included in at least one embodiment or example of the present disclosure. In the present specification, the schematic representation of the above terms is not necessarily directed to the same embodiment or example. Furthermore, the particular features, structures, materials, or characteristics described may be combined in a suitable manner in any one or more embodiments or examples. In addition, those skilled in the art can combine the different embodiments or examples described in the specification and the features of the different embodiments or examples without contradicting each other.

Finally, it should be noted that the above embodiments are only used to illustrate the technical solutions of the present disclosure, and are not limited thereto; although the present disclosure has been described in detail with reference to the foregoing embodiments, those of ordinary skill in the art should understand that it can still modify the technical solutions described in the foregoing embodiments, or replace some of the technical features, and the modifications and substitutions do not drive the essence of the corresponding technical solutions from the spirit and scope of the technical solutions of the embodiments of the present disclosure.

What is claimed is:

1. A display screen comprising:
   a backlight module comprising a backlight panel and a backlight source placed on one side of the backlight panel;
   an accommodation space at least penetrating the backlight module and used to accommodate functional elements; and
   a display panel comprising a non-display area corresponding to the accommodation space in the backlight module, a first display area being set on one side of the non-display area, which is further away from the backlight source than the other side of the non-display area, and a second display area surrounding the non-display area and the first display area, wherein the pixels per inch (PPI) of the first display area are smaller than the PPI of the second display area; at least two regions of the first display area have different PPIs based on different positions of the at least two regions.

2. The display screen of claim 1, wherein the pixels per inch (PPI) of the first display area and the second display area are configured to make the brightness of the first display area equal to the brightness of the second display area.

3. The display screen of claim 1, wherein the PPI of the first display area decreases from one side of the first display area which is away from the non-display area to one side of the first display area which is close to the non-display area.

4. The display screen of claim 1, wherein the PPI of the first display area decreases from a boundary between the first display area and the second display area to a center of the first display area.

5. The display screen of claim 4, wherein the center of the first display area is an area of the first display area having sparsest light rays.

6. The display screen of claim 1, wherein the backlight panel comprises a first backlight area corresponding to the first display area, and a second backlight area corresponding to the second display area, and the brightness of the first backlight area is stronger than the brightness of the second backlight area.

7. The display screen of claim 6, wherein at least two regions of the first backlight area have different brightness based on the positions of the at least two regions relative to the backlight source.

8. The display screen of claim 7, wherein the brightness of the first backlight area gradually increases from a side of the first backlight area away from the non-display area to a side of the first backlight area close to the non-display area.

9. The display screen of claim 7, wherein the brightness of the first backlight area gradually increases from a boundary between the first backlight area and the second backlight area toward a center of the first backlight area.

10. The display screen of claim 9, wherein the center of the first display area is an area of the first display area having sparsest light rays.

11. The display screen of claim 1, wherein the accommodation space is a through hole.

12. A mobile terminal comprising:
    a display screen comprising:
    a backlight module used to provide a backlight by a backlight source;
    an accommodation space at least penetrating the backlight module and used to accommodate functional elements; and
    wherein the pixels per inch (PPI) of a first display area of the backlight module is smaller than the PPI of a second display area of the backlight module, wherein the first display area is around the accommodation space and on one side of the accommodation space away from the backlight source; the pixels per inch (PPI) of the first display area and the second display area are configured to make the brightness of the first display area equal to the brightness of the second display area; and
    functional elements being electrically mounted in the accommodation space.

13. The mobile terminal of claim 12, wherein the functional elements comprise at least one front camera, one proximity light sensor, and one earpiece.

14. The display screen of claim 12, wherein the backlight panel comprises a first backlight area corresponding to the first display area, and a second backlight area corresponding to the second display area, and the brightness of the first backlight area is stronger than the brightness of the second backlight area.

15. A mobile terminal comprising:
a display screen comprising:
a backlight module comprising a backlight panel a backlight source disposed at a side of the black panel;
an accommodation space at least penetrating the backlight module and used to accommodate functional elements; and
a display panel comprising a non-display area corresponding to the accommodation space in the backlight module, a first display area being set on one side of the non-display area, which is further away from the backlight source than the other side of the non-display area, and a second display area surrounding the non-display area and the first display area, wherein the pixels per inch (PPI) of the first display area is smaller than the PPI of the second display area; the backlight panel comprises a first backlight area corresponding to the first display area, and a second backlight area corresponding to the second display area, and the brightness of the first backlight area is stronger than the brightness of the second backlight area; and
a non-display assembly mounted in the accommodation space and used to accommodate the functional elements.

* * * * *